UNITED STATES PATENT OFFICE.

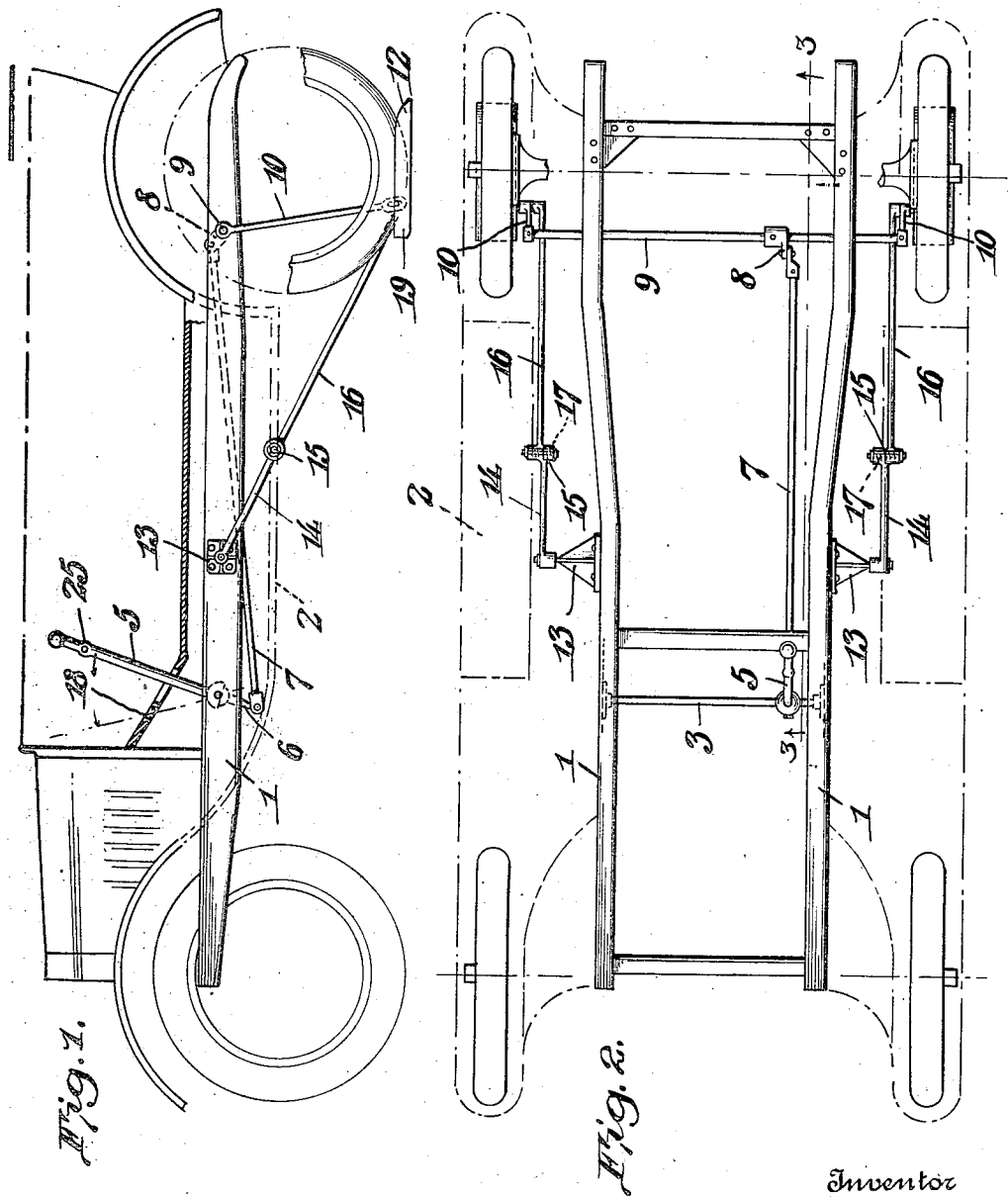

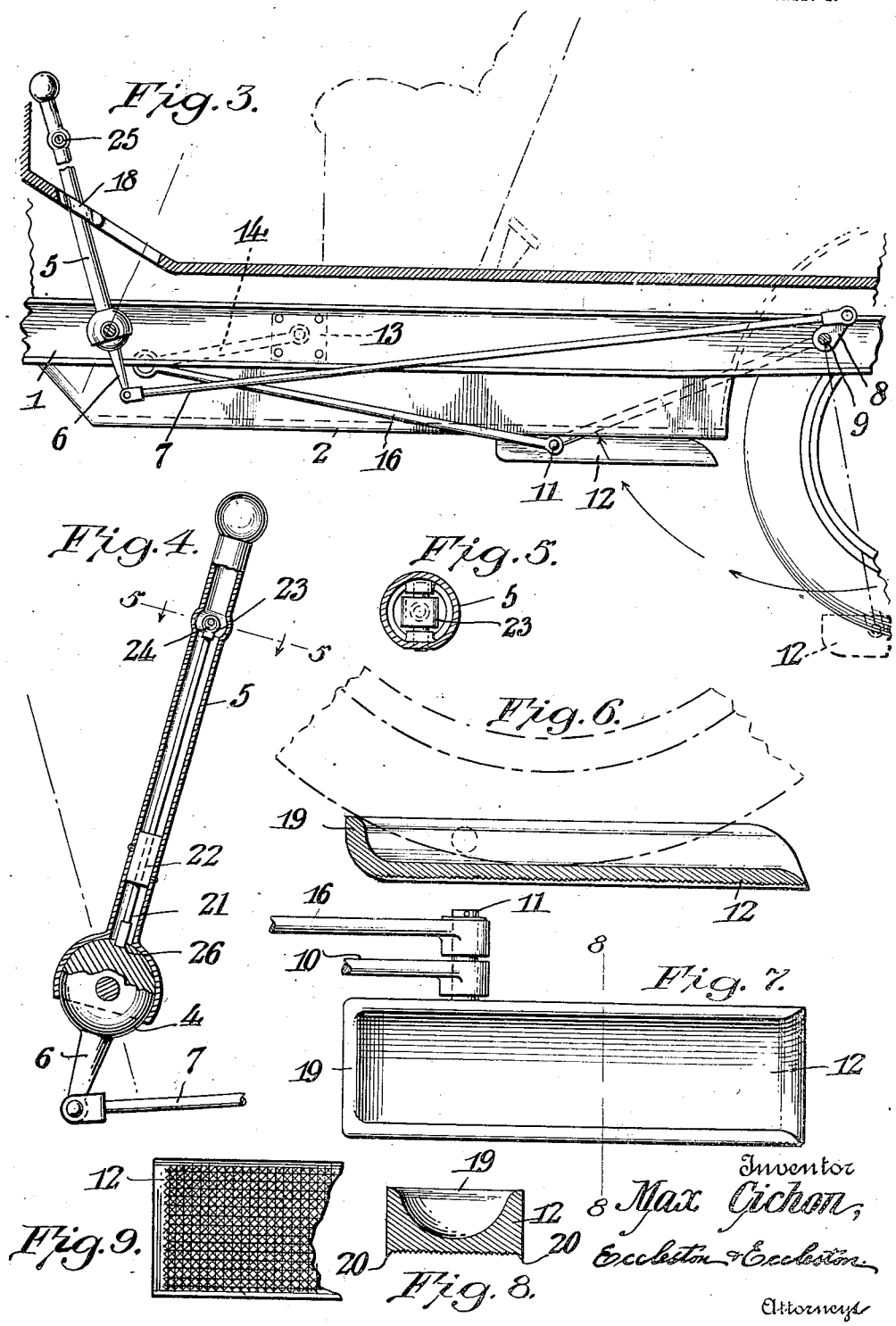

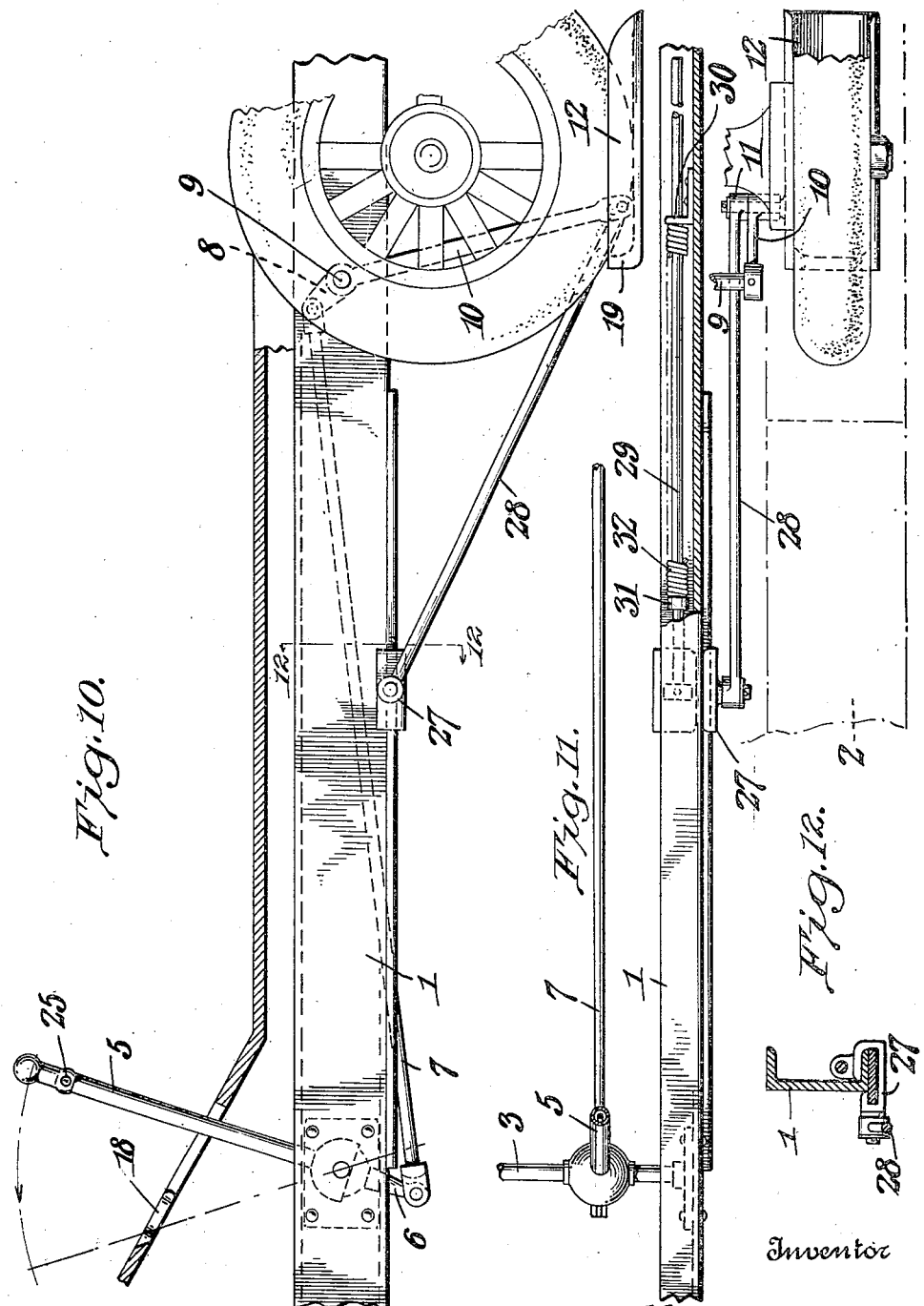

MAX CICHON, OF CHICAGO, ILLINOIS, ASSIGNOR TO VIRGINIA MARCIA CICHON, OF CHICAGO, ILLINOIS.

EMERGENCY BRAKE, ANTISKIDDING, AND ANTITHEFT DEVICE.

1,421,910.            Specification of Letters Patent.        Patented July 4, 1922.

Application filed June 3, 1922. Serial No. 565,618.

*To all whom it may concern:*

Be it known that I, MAX CICHON, a citizen of the United States, and a resident of Chicago, in the county of Cook and State of Illinois, have invented certain new and useful Improvements in Emergency Brake, Antiskidding, and Antitheft Devices, of which the following is a full, clear, and exact description.

My invention relates to an emergency brake, antiskidding, and antitheft device for automobiles and other vehicles, and one of the purposes of the invention is to provide an extremely strong, durable and effective brake mechanism which may be instantly thrown under the rear wheels, and by frictional engagement with the roadbed will quickly stop the car without wearing or burning the tires.

Another object of the invention is to provide a brake of this character which will fit snugly under the running board when not in operative position.

A further object of the invention resides in the provision of means whereby the car is positively prevented from skidding when the brake is applied.

Another very material feature of this invention resides in the provision of means whereby the car may be locked against theft.

I will now proceed to describe specific forms of my invention, it being understood that those skilled in the art may make many changes and modifications therein without departing from the spirit of my invention as defined in the appended claims; and the drawings forming part of this application are, therefore, to be considered merely as illustrative and not in any limiting sense.

In the drawings:

Figure 1 is a side elevation of an automobile with the apparatus applied thereto; the brake being in operative position.

Figure 2 is a plan view thereof.

Figure 3 is a vertical sectional view taken on line 3—3 of Figure 2, but showing the brake in inoperative position; the operative position of the brake being indicated diagrammatically.

Figure 4 is a detail view of the locking mechanism.

Figure 5 is a horizontal sectional view taken on line 5—5 of Figure 4.

Figure 6 is a detail sectional view of the brake shoe; the tire being shown in outline.

Figure 7 is a plan view of the brake shoe.

Figure 8 is a vertical transverse sectional view of the brake shoe taken on line 8—8 of Figure 7.

Figure 9 is a fragmentary plan view, showing the rasp-like surface of the brake shoe.

Figure 10 is a side elevation of a slightly modified form of the invention as applied to heavy trucks.

Figure 11 is a fragmentary plan view of the modified form of the apparatus, parts being broken away; and Figure 12 is a vertical transverse sectional view taken on line 12—12 of Figure 10.

Referring to the drawings more in detail, numeral 1 refers to the beams of the chassis, and numeral 2 indicates the usual running board. A shaft 3 is mounted in the beams, and at a suitable point is provided with a ball 4, on which is mounted an operating lever 5 to be hereinafter described. Extending downwardly from the ball is a short arm 6 which is pivotally connected to a link 7, the link being pivotally attached at its opposite end to a lever 8 rigidly attached to or integral with a shaft 9 rotatably mounted in the frame.

Arms 10, 10 are rigidly attached to the shaft 9 adjacent the ends thereof, and these arms are pivotally attached to lugs 11 formed on the brake shoes 12, the point of connection being so located that the weight of the shoe to the rear of the point of connection is slightly greater than the weight forward thereof, for a purpose to appear hereinafter.

Brackets 13 are mounted on the beams, and carry links 14 pivotally connected at 15 to links 16, which are in turn pivotally connected to the lugs 11 on the brake shoes. A coil spring 17 is provided at the point of connections of links 14 and 16, the arrangement being such that the spring tends to throw the links and shoe into inoperative position. As the bracket is subjected to a fairly heavy strain, I may prefer to lengthen the lugs 11 cast on the brake shoes, and thus secure a direct pull along or substantially along the chassis beams. A spring clip 18 holds the operating lever and associated mechanism in inoperative position.

The operation of the apparatus thus far described is as follows:

Assuming the apparatus to be in inoperative position as shown in Figure 3, if it is desired to apply the emergency brake it is only necessary to pull the operating lever 5 rearwardly, and through the link and lever connection the shoes will be thrown downwardly and rearwardly, and the rear wheels will ride up on the shoes, whereby the frictional engagement of the shoes with the roadbed will stop the car without any wear or burning of the tires. As will be described hereinafter, the brake shoe is so designed that it will receive a very great part of the strain, and the remainder of the strain will be taken up by the beams through the link connections 14 and 16. It may be noted here that the link connections 14, 16 and the arms 10, 10 prevent the shoes from jumping clear of the wheels on a rough roadbed, which would happen in a construction which employed chains or other loose connections.
When the shoes are free from the wheels, either by locking or by rebound, the pressure of coil springs 17 will assist in throwing the parts into inoperative position, so that it will not be necessary to apply much force to the operating lever. When the operating lever is thrown forward it will be grasped by the spring clip 18 and the parts will be securely held in inoperative position.

It has been previously mentioned that the shoes are slightly overbalanced rearwardly. The purpose of this construction is that as the shoe is lifted the rear end thereof will drop downwardly, so that the upper end will strike the running board, and as the movement is continued the shoe will assume a horizontal position directly under the running board.

The brake shoe possesses numerous advantages, and I will now proceed to give a detailed description thereof, reference being had particularly to Figures 6, 7, 8 and 9.

The shoe is open rearwardly so that the tire may enter freely, but at the front end thereof an abrupt shoulder 19 is formed. By providing this abrupt shoulder the tire is prevented from riding over the shoe, and at the same time this shoulder causes a very great part of the strain to be received by the shoe itself. Of course, the links 14 and 16 will also prevent the tire from riding over the shoe, and will transmit to the frame whatever strain is not taken up by the shoe itself.

By reference to Figure 8, it will clearly appear that the interior of the shoe is shaped to conform to the curvature of the tire. The shoes will, of course, be made of various sizes to fit different size tires; but for the same size tires I may make various shoes, all being of the same shape and size on the interior, but having frictional surfaces of different areas, which may be accomplished by having the bottom of the shoe of various lengths, or various breadths, or both.
The bottom of the shoe may be roughened in any desired manner to increase is efficiency in engaging the roadbed; but in the preferred form illustrated herein I provide a shallow flange 20 on both sides of the shoe, and these flanges are tapered downwardly. Between these flanges the entire under surface of the shoe has the configuration of an ordinary rasp. It will thus be apparent that when the shoes are thrown into operative position beneath the wheels the frictional engagement of the shoes will not only provide an extremely efficient brake, but also one which will positively avoid any possible skidding of the car. It will be understood, of course, that the design of the frictional or gripping surface will vary in accordance with the weight of the car, and also in accordance with the abruptness with which it is desired to stop the car.

One of the very material features of this invention resides in the provision of means for securely locking the car against theft; and such means will now be described.

Mounted to oscillate on the ball 4 is a hollow tube forming the operating lever 5, and mounted in this tube is a locking mechanism comprising a latch 21 passing through a guide sleeve 22 and having at its upper end an eccentric strap 23 engaging an eccentric 24. The eccentric is operated by a key in the usual manner, the keyhole being indicated by numeral 25. A notch 26 is provided in the ball 4 and is adapted to be engaged by the latch 21.

The operation of the locking mechanism is as follows:

As the car is parked the brake shoes will be thrown into operative position, and the key will then be turned to withdraw the latch from the notch, thus allowing the operating lever to move freely on the ball 4 without operating the brake mechanism. When it is desired to operate the car the lock will be turned to cause the latch to engage the notch 26, and it is only necessary to back the car to release the shoes, and then by moving the lever 5 forwardly the shoes will be housed under the running boards.

The apparatus may also be used as an antitheft device without placing the shoes under the wheels. It is only necessary to drop the shoes and then disengage the latch from the notch 26. In this condition it is impossible to lift the shoes without first turning the lock, and hence if an attempt is made to operate the car the wheels will ride up into the shoes and stop the car.

I will now describe the slightly modified form of the invention as applied to heavy trucks, reference being had to Figures 10, 11 and 12. The only change to be noted in this modified form resides in the provision of a different means for connecting the brake shoe with the frame. A slide member 27 is mounted to reciprocate on the beam 1, and a link 28 connects this slide member with the brake shoe 12. A rod 29 is carried by the slide member and extends rearwardly therefrom, passing through a guide 30. The rod 29 is provided with a shoulder 31, and a spring 32 is mounted on the rod between the shoulder and the guide. The spring 32 will be so designed that it will not exert much force until it has been compressed considerably. Therefore, when the brake is to be applied the operator does not have to overcome the pressure of the spring. As the operating lever is drawn rearwardly the shoes will drop, and the wheels riding up on the shoes will draw them rearwardly, thus compressing the springs under considerable pressure. When the shoes are released the springs will assist the operator in returning the various parts to their inoperative position.

From the foregoing description it will be apparent that I have provided a brake mechanism which is light in weight, simple in construction, inexpensive in manufacture, practical in operation, and which cannot fail in an emergency.

It will also be apparent that I have provided means which will positively prevent skidding of the car, and that the construction of the brake shoe is such that the shoe itself will receive the greater part of the strain.

Further, the locking means which I have provided in combination with the brake mechanism constitutes a most dependable means for preventing the theft of a car.

In accordance with the patent statues, I have described what I now believe to be the best embodiment of my invention, but I do not wish to be understood thereby as limiting myself or the scope of my invention, as many changes and modifications may be made without departing from the spirit of the invention; and all such I aim to include in the scope of the appended claims.

What I claim as new and desire to secure by Letters Patent is:

1. An apparatus of the character described, including a vehicle having a pair of driving wheels, a shaft mounted on said vehicle and means for operating said shaft, arms rigidly attached to said shaft, brake shoes carried by said arms and adapted to be projected under the wheels, forwardly extending links attached to the brake shoes and connecting said shoes with the vehicle frame, and springs connected to said links and exerting a force tending to throw the shoes into inoperative position.

2. An apparatus of the character described, including a vehicle having a running board and a pair of driving wheels, a shaft mounted on said vehicle and means for operating the shaft, arms rigidly attached to said shaft, brake shoes pivotally attached to said arms, the point of connection being so located that the shoes are slightly overbalanced rearwardly, whereby when the shoes are thrown into inoperative position the forward ends of the shoes will first strike the running board and cause the shoes to assume a horizontal position.

3. An apparatus of the character described, including a vehicle having a pair of driving wheels, a shaft mounted on said vehicle and means for operating said shaft, arms rigidly attached to said shaft, brake shoes carried by said arms and adapted to be projected under the wheels, links pivotally attached to the vehicle frame, links connecting said first mentioned links to the brake shoes, a spring provided at the point of connection of the two links, said spring tending to throw the mechanism into inoperative position, the construction and arrangement being such that the brake shoes will be housed under the running board when in inoperative position.

4. An apparatus of the character described, including a vehicle having a pair of driving wheels, downwardly extending arms carried by the vehicle, brake shoes carried by the arms, said shoes having downwardly extending flanges along the edges of the frictional or gripping surface of the shoes, said flanges having a beveled edge, the remainder of the gripping surface having a rasp-like configuration, the point of attachment of the arms to the shoes being so located that the shoes are slightly overbalanced rearwardly.

5. An apparatus of the character described, including a vehicle having a pair of driving wheels, a shaft mounted on said vehicle, arms carried by said shaft, brake shoes pivotally attached to said arms, the point of attachment being so located that the shoes are slightly overbalanced rearwardly, said shoes having a rasp-like gripping surface, and an abrupt shoulder provided on the forward portion of said shoes, whereby the shoes themselves receive the greater part of the strain.

6. An apparatus of the character described, including a vehicle having a pair of driving wheels, a shaft rotatably mounted on said vehicle, arms carried by said shaft, brake shoes carried by said arms and adapted to be projected under the wheels, a link operatively connected with said shaft and extending to the forward portion of the vehicle, an arm pivotally attached to the forward end of said link, said arm provided with a notch, a hollow operating lever mounted on said arm, and means arranged in the interior of said lever for engaging and disengaging said notch.

7. An apparatus of the character described, including a vehicle having a pair of driving wheels, a shaft rotatably mounted on said vehicle, arms carried by said shaft, brake shoes carried by said arms and adapted to be projected under the wheels, a link operatively connected with said shaft and extending to the forward portion of the vehicle, an arm pivotally attached to the forward end of said link, an operating lever movably mounted on said arm, and locking means carried by said lever and adapted to lock the arm and lever in engaged or disengaged position.

8. An apparatus of the character described, including a vehicle having a pair of driving wheels, a shaft rotatably mounted on said vehicle, arms carried by said shaft, brake shoes carried by said arms and adapted to be projected under the wheels, a link operatively connected with said shaft and extending to the forward portion of the vehicle, an arm pivotally attached to the forward end of the link, said arm being provided with a notch, a hollow operating lever mounted on said arm, a latch slidably mounted in the interior of said lever, and locking means provided on said lever, whereby said latch may be locked in or out of engagement with said notch.

MAX CICHON.